United States Patent
Schnacke

(10) Patent No.: US 8,741,015 B2
(45) Date of Patent: Jun. 3, 2014

(54) MULTISTAGE OIL SEPARATOR

(75) Inventor: Ernst Schnacke, Cologne (DE)

(73) Assignee: Oerlikon Leybold Vacuum GmbH, Cologne (DE)

( * ) Notice: Subject to any disclaimer, the term of this patent is extended or adjusted under 35 U.S.C. 154(b) by 38 days.

(21) Appl. No.: 13/381,669

(22) PCT Filed: Jun. 18, 2010

(86) PCT No.: PCT/EP2010/058639
§ 371 (c)(1),
(2), (4) Date: Mar. 1, 2012

(87) PCT Pub. No.: WO2011/000720
PCT Pub. Date: Jan. 6, 2011

(65) Prior Publication Data
US 2012/0144789 A1   Jun. 14, 2012

(30) Foreign Application Priority Data
Jul. 2, 2009 (DE) .......................... 10 2009 031 420

(51) Int. Cl.
*B01D 59/50* (2006.01)
*B01D 24/00* (2006.01)
*B01D 25/00* (2006.01)
*B01D 27/00* (2006.01)
*B01D 29/00* (2006.01)
*B01D 35/00* (2006.01)
*B01D 21/30* (2006.01)

(52) U.S. Cl.
USPC ............... 55/482; 210/315; 210/149; 55/485; 55/486; 55/487

(58) Field of Classification Search
USPC ............. 210/315, 149, 345; 55/482, 485–487
See application file for complete search history.

(56) References Cited

U.S. PATENT DOCUMENTS

| | | | |
|---|---|---|---|
| 3,890,123 A | 6/1975 | Kuga | |
| 4,105,561 A | 8/1978 | Domnick | |
| 4,203,739 A | 5/1980 | Erdmannsdorfer | |
| 4,502,955 A * | 3/1985 | Schaupp | 210/149 |
| 4,632,682 A | 12/1986 | Erdmannsdorfer | |
| 4,692,175 A | 9/1987 | Frantz | |
| 4,909,937 A * | 3/1990 | Hoffmann et al. | 210/315 |
| 5,284,997 A | 2/1994 | Spearman et al. | |
| 5,800,584 A * | 9/1998 | Hinderer et al. | 55/482 |
| 6,254,788 B1 * | 7/2001 | Davidson | 210/764 |
| 7,563,299 B2 * | 7/2009 | Baptista da Costa et al. | 55/488 |
| 8,152,887 B2 * | 4/2012 | Patel | 55/485 |

FOREIGN PATENT DOCUMENTS

| | | |
|---|---|---|
| DE | 1001970 | 2/1957 |
| DE | 2510225 | 10/1975 |
| DE | 7504581 U1 | 2/1976 |
| DE | 7726666 U1 | 5/1978 |
| DE | 8501736 U1 | 10/1985 |
| GB | 1490270 | 10/1977 |

* cited by examiner

*Primary Examiner* — Amber Orlando
(74) *Attorney, Agent, or Firm* — Fay Sharpe LLP

(57) ABSTRACT

In order to provide an improved multistage oil separator, in particular for the use with compressors in cryogenics, the oil separator includes a housing (10) having a gas inlet (18) and a gas outlet (20), and at least two filter elements (26, 28) arranged as a cascade in the housing between the gas inlet (18) and the gas outlet (20).

8 Claims, 1 Drawing Sheet

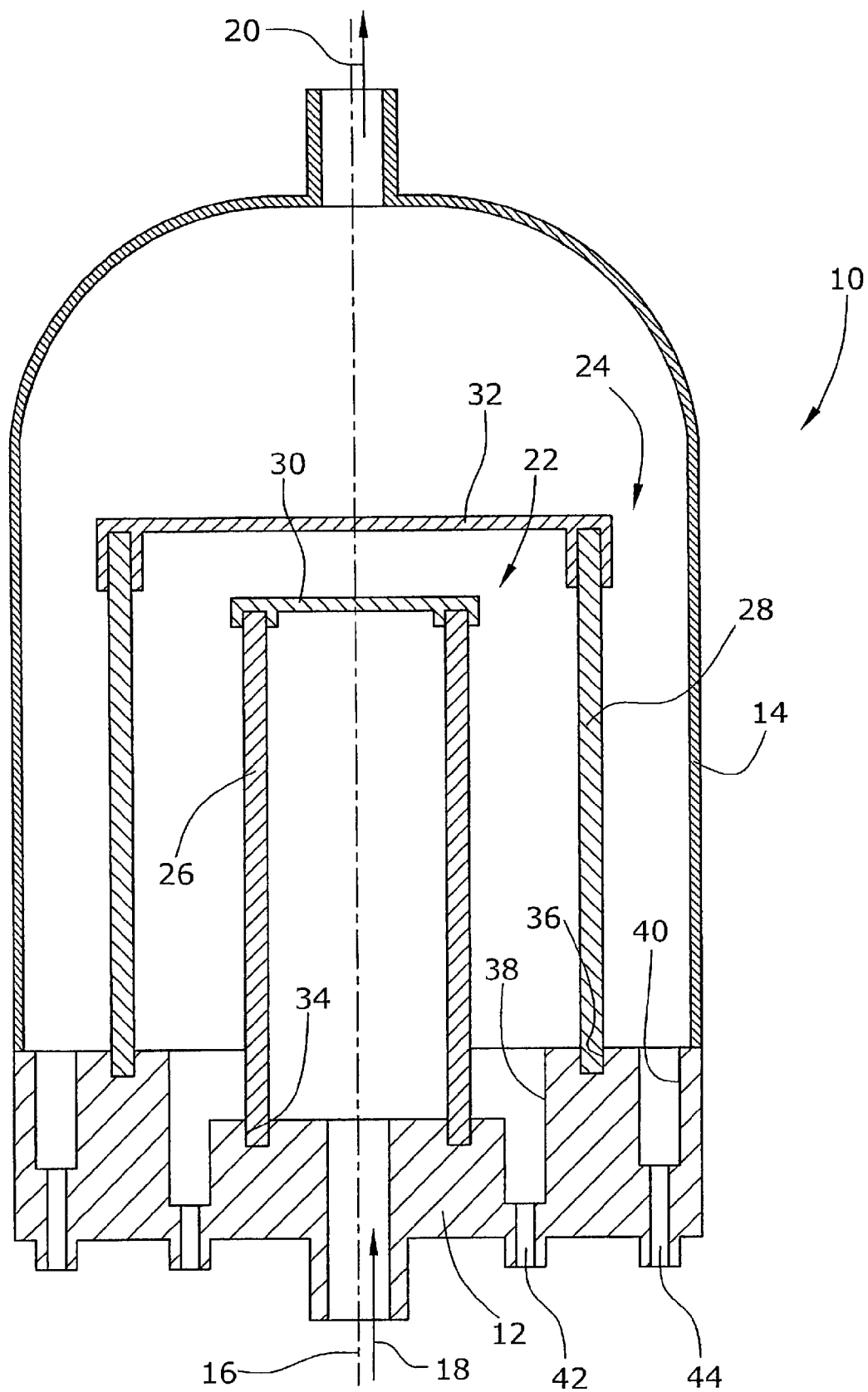

MULTISTAGE OIL SEPARATOR

BACKGROUND

The invention relates to a multistage oil separator, particularly for use in compressors in cryotechnology.

In a cryo pump, helium will be condensed by a compressor to about 20-25 bar and, by subsequent expansion down to a pressure between about 1 and 8 bar, the helium will be cooled. For this purpose, the helium must have a high degree of purity. Condensation is typically performed by use of oil-sealed scroll compressors wherein parts of the oil will enter the helium. To avoid condensation or solidification, as much oil as technically feasible has to be separated.

To this end, use has been made heretofore of oil separators wherein oil is passed through one or a plurality of filter units.

It is an object of the invention to provide an improved oil separator.

SUMMARY

According to one aspect of the present invention, the oil separator is of a multi-stage configuration comprising a housing having a gas inlet and a gas outlet, at least two filter elements being arranged as a cascade in the housing between the gas inlet and the gas outlet. Arrangement of a plurality of filter elements in a common housing makes it possible to reduce the costs for the housing.

Preferably, for discharging the separated oil from the housing, an oil passage is provided at least between the last filter element of the cascade and the gas outlet, while the separated oil can be returned into the compressor system. In a vertical arrangement, the possibility exists that, under the effect of gravity, the separated oil will run down on the filter elements. In this regard, it is advantageous if an oil passage is formed in the housing near the filter element so that the oil running down on the filter element will creep in the direction of said oil passage. For catching the oil, an indentation can be formed in the housing which, in the manner of an eaves gutter, will guide the caught oil toward the oil passage. Preferably, at least one oil passage is provided behind each filter element. The oil passages can enter a common channel for returning the oil.

The filters can be fastened to a common housing flange wherein the return conveyance of the oil can be performed through the housing flange. Herein, the filter elements can be formed by the outer surfaces of cylindrical cartridges having differently sized diameters, at least two filter cartridges being located on a common longitudinal axis. In this case, there can be provided an arrangement of the two filter elements on a common axis on respectively mutually opposite sides of the housing flange, which is to say that, in a vertical arrangement of the filter cartridges, one filter element is attached standing on the flange and the other one is attached suspended from the flange. During the passage of the gas through the cylindrical filter element from the inside to the outside, the gas can be guided first via a channel through the flange into the interior of the smaller-diametered filter cartridge wherein the gas, after flowing through this filter element, can be guided via a further channel through the flange into the interior of the larger-diametered filter element.

By way of alternative, it is of particular advantage if at least two filter cartridges arranged on a common axis are placed on the same side of the housing flange so that the filter cartridges are inserted into each other. The smaller-diametered filter cartridge is preferably fully contained in the larger-diametered filter cartridge. The gas inlet into the housing can be guided into the interior of the filter cartridge through the housing flange, wherein the gas is flowing toward the outside through the filter elements on the same side of the housing flange in radial direction relative to the common axis. There can also be envisioned a combination of the arrangement of a plurality of mutually inserted filter elements on different sides of the housing, wherein the gas will first flow radially through the mutually inserted filter cartridges on one flange side and subsequently will flow radially through the mutually inserted filter cartridges on the other flange side.

BRIEF DESCRIPTION OF THE DRAWINGS

An exemplary embodiment of the invention will be explained in greater detail hereunder with reference to the FIGURE. The FIGURE shows a longitudinal sectional view of a multi-staged oil separator.

DETAILED DESCRIPTION

Said oil separator comprises a substantially cylindrical outer housing 10 having a housing flange 12 and a housing lid 14. Housing lid 14 is provided as a cylindrical bell which is mounted on housing flange 12 and removably attached thereto. One end side of the cylindrical housing is formed by housing flange 12, and the other, opposite end side is formed by a part of housing lid 14. The substantially cylindrical housing 10 is configured with rotational symmetry relative to a longitudinal axis 16.

In said housing flange 12, a gas inlet 18 is formed in the region of longitudinal axis 16. In the opposite end side formed by a part of housing lid 14, a gas outlet 20 is formed in the region of longitudinal axis 16. Longitudinal axis 16 is oriented vertically.

On flange 12, within housing lid 14, two filter cartridges 22,24 of substantially cylindrical shape are detachably fastened. The two filter cartridges 22, 24 are each formed with rotational symmetry relative to longitudinal axis 16, the diameter of the inner filter cartridge 22 being smaller than the diameter of the outer filter cartridge 24. The filter elements 26,28 are each formed by the cylindrical outer surface of the respective filter cartridge 22,24. Each of the filter cartridges 22,24 is closed by a cartridge lid 30,32 on its end side opposite to flange 12. The filter cartridges 22,24 are each fastened in an indentation 34,36 extending in an annular configuration about the longitudinal axis 16. Filter element 26 is inserted into, and bonded to, the inner indentation 34. In a corresponding manner, the outer filter element 28 is inserted into, and bonded to, the outer indentation 36.

Between said indentations 34,36, flange 12 is provided with an a continuous annular groove 38 having its center on the longitudinal axis 16, said groove serving for catching the oil separated by filter element 26. In a corresponding manner, a continuous annular groove 40 having its center on the longitudinal axis 16 is provided externally of indentation 36, said groove serving for catching the oil separated by filter element 28. At the bottom end of each groove 38,40, a respective oil passage 42,44 is formed through flange 12. The two oil passages enter a common channel, not shown in the FIGURE, through which the separated oil caught by the grooves 38,40 will be returned to the compressor system.

The gas to be cleansed will flow through the gas inlet 18 into the housing 10 and into the inner filter cartridge 22 and, from there, radially outward through the filter elements 26,28. Subsequently, the gas will be directed from the housing lid 14 toward the gas outlet 20 through which the gas will leave the housing 10 again. While the gas is passing through the filter elements 26,28, the filter elements 26,28 catch the separated oil. Under the influence of gravity, the separated oil will run along on the outer sides of the filter elements 26,28 towards the respective groove 38,40 and, via the groove 38,40, will be guided toward the respective oil passage 42,44. The filter cartridges 22,24 are located internally of the housing in the high-pressure region of the system so that, due to the pressure difference, the separated oil will be returned through the oil passages 42,44 in the direction toward the low pressure side of the system.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A multistage oil separator, comprising a housing having a gas inlet and a gas outlet, and at least two filter elements arranged as a cascade in the housing between the gas inlet and the gas outlet,
   wherein the at least two filter elements are each arranged vertically and extending upwardly from the housing such that the separated oil will run down on the filter elements under the effect of gravity, and
   wherein the housing comprises:
   respectively one oil passage downstream of each of the at least two filter elements, and continuous annular grooves for catching the oil and guiding the caught oil toward the oil passage in the manner of an eves gutter.

2. The oil separator according to claim 1, wherein the housing comprises an oil passage between a last of the at least two filter elements of the cascade and the gas outlet, said oil passage being provided for returning the separated oil.

3. The oil separator according to claim 1, wherein the at least two filter elements are attached to a common housing flange.

4. The oil separator according to claim 3, wherein at least one oil passage extends through the housing flange.

5. The oil separator according to claim 1, wherein the at least two filter elements include at least two cylindrical cartridges having differently sized diameters, the at least two filter elements being disposed on a common axis.

6. The oil separator according to claim 5, wherein the at least two filter elements are arranged on the common axis on two mutually opposite sides of a flange.

7. The oil separator according to claim 5, wherein the at least two filter elements are arranged on the common axis on the same side of the flange.

8. A multistage oil separator for separating oil from a cryogenic gas which is being compressed, the oil separator comprising:
   a housing which includes a lower portion and an upper portion;
   a gas inlet defined in the lower housing portion and configured to receive compressed cryogenic gas from a compressor stage;
   a first filter element extending vertically upward from the lower housing portion and downstream from the gas inlet to separate oil from the compressed cryogenic gas such that the separated oil flows by gravity down the first filter element toward the lower housing portion;
   a second filter element disposed to receive the compressed cryogenic gas which passed through the first filter element and separate oil therefrom, the second filter element extending vertically upward from the lower housing portion such that the separated oil flows by gravity down the second filter element toward the lower housing portion;
   a gas outlet defined in the upper housing portion and configured to receive compressed cryogenic gas which has passed through the first and second filters;
   a first annular groove defined in the base portion between the first and second filter elements and extending around and downstream from the first filter element to catch the oil flowing down at least the first filter element;
   a second annular groove defined in the base portion around and downstream from the second filter element to catch the oil flowing down the second filter element; and
   at least one oil passage which returns oil separated from the compressed cryogenic gas to the compressor stage, the at least one oil passage being connected with the first and second annular grooves.

* * * * *